United States Patent [19]

Yamada et al.

[11] Patent Number: 4,735,115
[45] Date of Patent: Apr. 5, 1988

[54] METHOD FOR MANUFACTURING THROW-AWAY HOB

[75] Inventors: Yoshikazu Yamada, Hirakata; Kiyoshi Kaneshiro, Yawata, both of Japan

[73] Assignee: Kabushiki Kaisha Kamatsu Seisakusko, Tokyo, Japan

[21] Appl. No.: 15,344

[22] Filed: Feb. 17, 1987

[30] Foreign Application Priority Data

Feb. 18, 1985 [JP] Japan ................... 61-031919

[51] Int. Cl.⁴ .................... B23H 9/00; B21F 21/16
[52] U.S. Cl. .................... 76/101 A; 219/69 M; 204/129.1
[58] Field of Search .............. 76/101 R, 101 A; 219/69 M, 69 V, 69 RS; 204/129.1, 129.2

[56] References Cited

FOREIGN PATENT DOCUMENTS 5220496 2/1977 Japan .
57-144622 9/1982 Japan .
255325 12/1986 Japan ................. 219/69 M

OTHER PUBLICATIONS

Ingersoll, MAX-1-HOB Wendeplatten-Abwalzfraser.
Fette, Product Information 1055.

*Primary Examiner*—Roscoe V. Parker
*Attorney, Agent, or Firm*—Ronald P. Kananen

[57] ABSTRACT

A method for manufacturing a throw-away hob includes the steps of cutting screw threads on a threaded body at equally spaced intervals in the circumferential direction of the body and continuously in the axial direction thereof so as to form a throw-away hob body having a plurality of adjacent unit screw threads formed at equally spaced intervals in the circumferential direction of the hob body and in plurality of rows disposed in the axial direction thereof, allowing the threaded side surfaces of a plurality of axially aligned unit screw threads to be subjected to electrical discharge machining so as to form throw-away tip mounting seat surfaces thereat; and fixedly securing a throw-away tip to each of the seat surfaces thus formed.

4 Claims, 2 Drawing Sheets

METHOD FOR MANUFACTURING THROW-AWAY HOB

BACKGROUND OF THE INVENTION

This invention relates to a method for manufacturing a throw-away hob having throw-away tips mounted on the side surfaces of a plurality of unit screw threads formed at the screw threads of a threaded body.

In the well known conventional manufacturing process for throw-away hobs, it has been very difficult to form or machine, with a high degree of precision, throw-away tip mounting seat surfaces on the screw threads of a threaded body or on a plurality of unit screw threads thereof. As a result, the accuracy of mounting throw-away tips was poor, thereby adversely influencing the accuracy of machining gears to be cut by the throw-away hob.

The machining accuracy obtained in the formation of throw-away hob mounting seat surfaces by the well known conventional machining work has been limited. Therefore, in late years, there have been devised a method of manufacturing a hob wherein seat surfaces are formed by machining by means of an end mill, and the like on a unit body having a row of peripherally extending threaded portions, whereupon throw-away tips are fitted to the seat surfaces, and another manufacturing method wherein a plurality of locaters are formed with seat surfaces by machining, and then the locaters are fitted in the peripheral surface of the hob body to provide a throw-away hob.

However, according to such recently developed manufacturing methods, the number of component parts of the hob and the number of machining operations have increased and the assembly operation has become troublesome, thus increasing the manufacturing cost thereof. Moreover, such manufacturing methods have a disadvantage that errors in the assembly result in a lower accuracy of mounting throw-away tips.

SUMMARY OF THE INVENTION

The present invention has been contemplated in view of the above-mentioned circumstances, and has for its object to provide a method capable of machining, readily and with a high degree of accuracy, throw-away tip mounting seat surfaces on the side surfaces of a plurality of unit screw threads formed on the pheripheral surface of a throw-away hob body.

Another object of the present invention is to provide a method capable manufacturing a throw-away hob with a high accuracy for mounting throw-away tips at a low cost.

To achieve the above-mentioned objects, according to the present invention, there is provided a method for manufacturing a throw-away hob, comprising the steps of cutting screw threads on a threaded body at equal space intervals in the circumferential direction of the body and continuously in the axial direction thereof so as to form a throw-away hob body having a plurality of adjacent unit screw threads formed at equal space intervals in the circumferential direction of the hob body and in a plurality of rows disposed in the axial direction thereof; allowing the threaded side surfaces of a plurality of axially aligned unit screw threads formed on said throw-away hob body to be subjected to electrical discharge machining by means of an electrode for the machining so as to form throw-away tip mounting seat surfaces thereat; and fixedly securing a throw-away tip to each of the seat surfaces thus formed.

According to a first aspect of the present invention, the throw-away tip mounting seat surfaces are formed on both the side surfaces of each unit screw thread.

According to a second aspect of the present invention, the throw-away tip mounting seat surfaces are formed on both the side surfaces of each unit screw thread.

According to a third aspect of the present invention, the throw-away tip mounting seat surfaces are formed alternately on the opposite surfaces of a respective pair of mutually adjacent unit threads disposed circumferentially on the throw-away hob body in the form of a single screw thread.

According to a fourth aspect of the present invention, the electrode for electrical discharge machining has a plurality of electrode projections, one side surface of each of the electrode projections being of a forming shape relative to each of the throw-away tip mounting surfaces respectively formed on one side surface of a row of axially aligned unit screw threads of the throw-away hob body and, on the other hand, the other side surface of each of said electrode projections being not allowed to be brought into contact with the other side surface of each of the unit screw threads.

The above and many other advantages, features and additional objects of the present invention will become apparent to those versed in the art upon making reference to the following detailed description and accompanying drawings in which a preferred structural embodiment incorporating the principles of the present invention are shown by way of illustrative example.

DETAILED DESCRIPTION OF THE INVENTION

Figure 1:
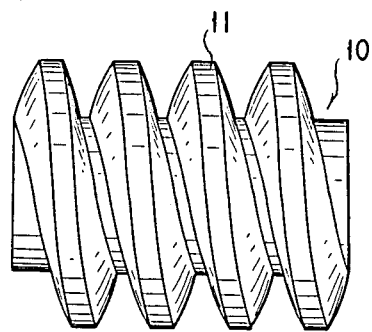
FIG. 1 is a plan view of a threaded body arranged to be subjected to electrical discharge machining to manufacture a throw-away hob according to the method of the present invention.
Figure 2:
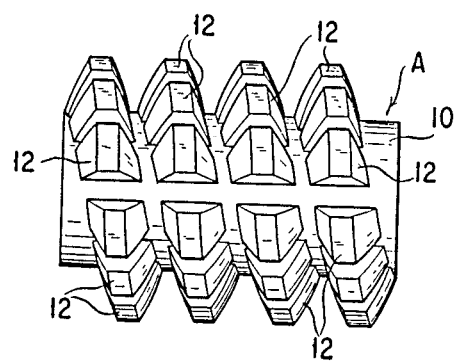
FIG. 2 is a front view of the threaded body having threaded portions formed in a plurality of unit screw threads.

Screw threads 11 on a threaded body 10 shown in FIG. 1 are cut at equally spaced intervals in the circumferential direction of the body 10 and continuously in the axial direction thereof as shown in FIG. 2 to thereby form a throw-away hob body "A" having a plurality of adjacent unit screw threads 12 formed at equally spaced intervals in the circumferential direction of the hob body "A" and in a plurality of rows in the axial direction thereof.

Subsequently, the throw-away hob body "A" is subjected to a machining step to form seat surfaces 23 each being adapted to be fitted with a throw-away tip 22 on one side surface 12a or on both side surfaces 12a and 12b on each of the unit screw threads 12.

Figure 3A:
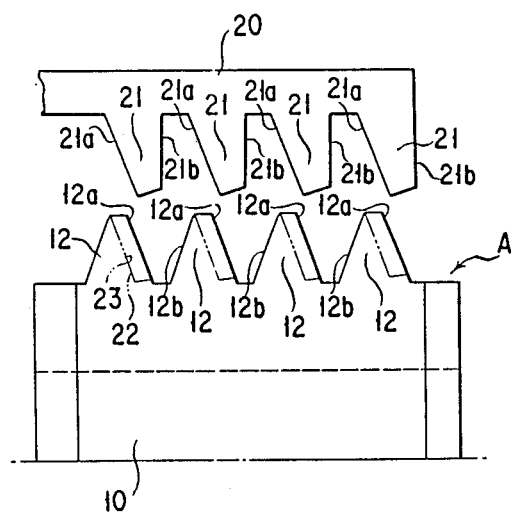
FIGS. 3A and 3B are schematic explanatory views each showing the formation of throw-away tip mounting seat surfaces on the side surfaces of a row of axially aligned unit screw threads on the threaded body.
Figure 3B:
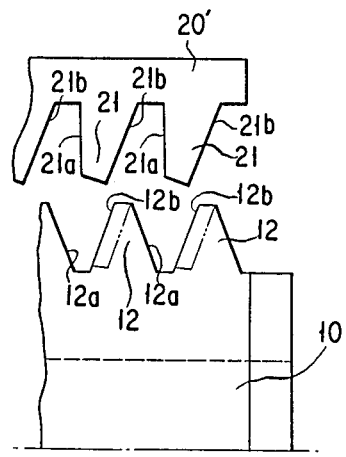

In the present invention, this machining step is made by electrical discharge machining using discharge electrodes 20 and 20' as shown in FIGS. 3A and 3B.

In FIG. 3A, the discharge electrode 20 has a plurality of electrode projections 21 formed thereon so as to project in between a row of axially adjacent unit screw threads 12 on the hob body "A". Each of the electrode projections 21 has side surfaces 21a and 21b. The arrangement is made such that the side surface 21a is held in parallel with the one side surface 12a (located on right side in the drawing), whilst the other side surface 21b of each electrode projection 21 is not allowed to be brought into contact with the other side surface 12b (located on the left side in the drawing) of each of the unit screw threads 12. The width of the electrode projection 21 (the length thereof in the direction at right angles to the plane of the drawing) is the same as that of the throw-away tip 22. Stated in brief, one side surface 21a of each of the electrode projections 21 of the discharge electrode 20 is of a forming shape relative to each of the throw-away tip mounting seat surfaces 23 formed on the one side surfaces 12a of a row of axially aligned unit screw threads 12 of the hob body "A".

The arrangement is made such that the discharge electrode 20 is moved towards the hob body "A" and located in proximity thereto to allow the one side surfaces 12a on one row of axially adjacent unit screw threads 12 of the hob body "A" to be subjected simultaneously to electrical discharge machining by means of the electrode projections 21 to thereby form the seat surfaces 23 on each of which a throw-away tip 22 is to be mounted.

Upon completion of this electrical discharge machining, the discharge electrode 20 is moved apart from the hob body "A", and then the hob body "A" is indexed by rotating it by a predetermined angle so as to locate the next row of unit screw threads 12, which is adjacent peripherally to the one row of axially adjacent unit screw threads 12 which has been machined, opposite to the discharge electrode 20. At the same time, the discharge electrode 20 is axially moved in synchronism with the indexing of the body "A" to allow its one side surfaces 21a to be brought into contact with the corresponding side surfaces 12a, respectively.

In the same manner as mentioned above, the one side surfaces 12a of the next row of axially adjacent unit screw threads 12 will be simultaneously subjected to electrical discharge machining to form the seat surfaces 23 each being adapted to be fitted with a throw-away tip 22.

Upon completion of the formation of the seat surfaces 23 on the one side surfaces 12a of all the unit screw threads 12 by the electrical discharge machining, as shown in FIG. 3B, another discharge electrode 20' comprising electrode projections 21 each having another side surface 21b adapted to be brought into contact with the other side surface (the left side surface) 12b of each of the unit screw threads 12 is used to allow the other side surfaces 12b of all the unit screw threads 12 to be subjected to an electrical discharge machining to form throw-away tip mounting seat surfaces 23.

Thus, the throw-away tip mounting seat surfaces 23 can be machined readily, uniformly and with a high degree of precision on both side surfaces 12a and 12b of all the unit screw threads 12 formed on the peripheral surface of the hob body "A".

Whilst, in the foregoing, there is described a method for manufacturing a throw-away hob having throw-away tip mounting seat surfaces 23 formed on both side surfaces 12a and 12b of all the unit screw threads 12, it can also be readily achieved by the method of the present invention to form throw-away tip mounting seat surfaces alternately on the opposite side surfaces on respective two mutually adjacent unit screw threads disposed circumferentially on the throw-away hob body "A" in the form of a single screw thread.

Stated in brief, with respect to an axially first row of unit screw threads 12 formed on the hob body "A", the one side surfaces 12a of the unit screw threads 12 are subjected to an electrical discharge machining by means of the one side surfaces 21a of the electrode projections 21 of the discharge electrode 20, and after the hob body "A" has been indexed by rotating it by a predetermined angle the other side surfaces 12b of the unit screw threads 12 are subjected to electrical discharge machining by means of the other side surfaces 21b of the electrode projections 21 of another discharge electrode 20'.

By repeating alternately the above-mentioned two machining steps, throw-away tip mounting seat surfaces 23 can be formed alternately on the opposite side surfaces of the mutually adjacent two unit screw threads aligned peripherally on the throw-away hob body "A".

Figure 4:
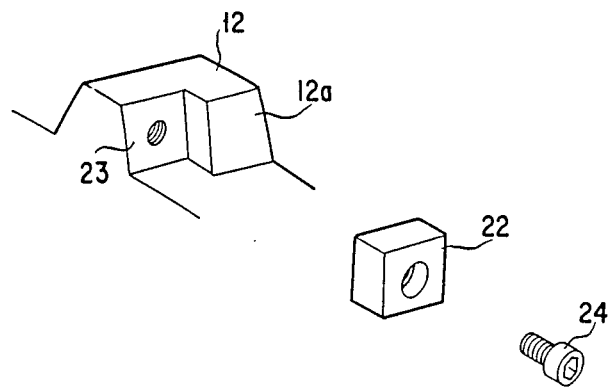
FIG. 4 is a partially disassembled perspective view of a throw-away tip mounting portion.

After the completion of the electrical discharge machining to form the seat surfaces 23, a throw-away tip 22 is fixedly secured by means of a bolt 24 to each of the throw-away tip mounting seat surfaces 23 as shown in FIG. 4.

It is to be understood that the foregoing description is merely illustrative of a preferred embodiment of the present invention and that the invention is not to be limited thereto, but is to be determined by the scope of the appended claims.

What is claimed is:

1. A method for manufacturing a throw-away hob, comprising the steps of:
   (a) cutting screw threads on a threaded body at equally spaced intervals in the circumferential direction of the body and continuously in the axial direction thereof so as to form a throw-away hob body having a plurality of adjacent unit screw threads formed at equally spaced intervals in the circumferential direction of the hob body and in a plurality of rows in the axial direction thereof;
   (b) allowing the threaded surfaces of a plurality of axially aligned unit screw threads formed on said throw-away hob body to be subjected to electrical discharge machining by means of an electrode for said machining so as to form throw-away tip mounting seat surfaces thereat; and
   (c) fixedly securing a throw-away tip to each of said seat surfaces thus formed.

2. The method as set forth in claim 1, characterized in that said throw-away tip mounting seat surfaces are formed on both surfaces of each of the unit screw threads.

3. The method as set forth in claim 1, characterized in that said throw-away tip mounting seat surfaces are formed alternately on the opposite surfaces of respective two mutually adjacent unit screw threads disposed circumferentially on the throw-away hob body in the form of a single screw thread.

4. The method as set forth in claim 1, characterized in that said electrode for electrical discharge machining has a plurality of electrode projections, one side surface of each of said electrode projections being of a forming shape relative to each of said throw-away tip mounting surfaces respectively formed on one side surfaces of a row of axially aligned unit screw threads of the throw-away hob body and, on the other hand, the other side surface of each of said electrode projections being not allowed to be brought into contact with the other side surface of each of said unit screw threads.

* * * * *

UNITED STATES PATENT AND TRADEMARK OFFICE
CERTIFICATE OF CORRECTION

PATENT NO. : 4,735,115
DATED : April 5, 1988
INVENTOR(S) : Yamada et al

It is certified that error appears in the above-identified patent and that said Letters Patent is hereby corrected as shown below: On the Title Page:

Heading [73] Assignee should read

-- Kabushiki Kaisha Komatsu Seisakusho, Tokyo, Japan --.

Signed and Sealed this

Twenty-second Day of November, 1988

Attest:

DONALD J. QUIGG

*Attesting Officer*

*Commissioner of Patents and Trademarks*